US005776342A

United States Patent [19]
Hiranaga et al.

[11] Patent Number: 5,776,342
[45] Date of Patent: Jul. 7, 1998

[54] FILTER ASSEMBLY

[75] Inventors: Hajime Hiranaga; Hidenori Nakayama, both of Ibaraki-Ken, Japan

[73] Assignee: Pall Corporation, East Hills, N.Y.

[21] Appl. No.: 611,110

[22] Filed: Mar. 5, 1996

[51] Int. Cl.⁶ .................................................. B01D 27/08
[52] U.S. Cl. .......................... 210/442; 210/453; 210/455; 210/485; 210/497.01
[58] Field of Search .................................. 210/232, 238, 210/441, 442, 453, 455, 485, 497.01; 55/500, 521

[56] References Cited

U.S. PATENT DOCUMENTS

| | | |
|---|---|---|
| Re. 31,912 | 6/1985 | Fortuna et al. |
| 360,441 | 4/1887 | Howes . |
| 629,377 | 7/1899 | Leland . |
| 1,175,948 | 3/1916 | French . |
| 1,669,461 | 5/1928 | Gamble . |
| 2,145,535 | 1/1939 | Vokes . |
| 2,331,332 | 10/1943 | Latta . |
| 2,395,449 | 2/1946 | Briggs . |
| 2,420,414 | 5/1947 | Briggs . |
| 2,537,992 | 1/1951 | Gross et al. |
| 2,586,078 | 2/1952 | O'Malley . |
| 2,689,652 | 9/1954 | Gretzinger . |
| 2,759,610 | 8/1956 | James . |
| 2,801,009 | 7/1957 | Bowers . |
| 2,979,209 | 4/1961 | Nolden . |
| 3,002,870 | 10/1961 | Belgarde et al. |
| 3,054,507 | 9/1962 | Humbert, Jr. et al. |
| 3,122,501 | 2/1964 | Hultgren . |
| 3,174,625 | 3/1965 | Briggs . |
| 3,241,680 | 3/1966 | Humbert, Jr. |
| 3,244,574 | 4/1966 | Decker et al. |
| 3,314,546 | 4/1967 | Briggs . |
| 3,317,043 | 5/1967 | Vanderpoel ................. 210/442 |
| 3,389,797 | 6/1968 | Giardini . |
| 3,392,843 | 7/1968 | Mumby . |
| 3,438,825 | 4/1969 | Fidler . |
| 3,499,068 | 3/1970 | Brown . |
| 3,501,013 | 3/1970 | Madsen . |
| 3,503,511 | 3/1970 | Spitzberg . |
| 3,547,719 | 12/1970 | Kasten . |
| 3,696,932 | 10/1972 | Rosenberg . |

(List continued on next page.)

FOREIGN PATENT DOCUMENTS

| | | |
|---|---|---|
| 824484 | 10/1969 | Canada . |
| 92305748 | 6/1992 | European Pat. Off. |
| 0605018 | 12/1993 | European Pat. Off. |
| 2940144 | 10/1979 | Germany . |
| 2800425 | 12/1979 | Germany . |
| 3837423 | 10/1990 | Germany . |
| 45-30398 | 10/1970 | Japan . |
| 53-5075 | 1/1978 | Japan . |
| 61-61012 | 4/1986 | Japan . |
| 61-227809 | 10/1986 | Japan . |
| 62-273008 | 11/1987 | Japan . |
| 63-65908 | 3/1988 | Japan . |
| 4122614 | 11/1992 | Japan . |
| 5345357 | 12/1993 | Japan . |
| 841818 | 2/1959 | United Kingdom . |
| 1003164 | 10/1962 | United Kingdom . |
| 1201156 | 11/1966 | United Kingdom . |
| 1400147 | 8/1971 | United Kingdom . |
| 2230472 | 4/1990 | United Kingdom . |
| WO 84/04050 | 10/1984 | WIPO . |
| 9421362 | 3/1994 | WIPO . |
| WO95/10346 | 4/1995 | WIPO . |

OTHER PUBLICATIONS

"Chem–Line II PF Disposable Filters"; pp. 56–64.

*Primary Examiner*—W. L. Walker
*Attorney, Agent, or Firm*—Leydig, Voit & Mayer, Ltd.

[57] ABSTRACT

A capsule type filter assembly provides increased strength by fixing ends caps of a filter element to a housing at both ends. At one end, a tubular part extends through a hole in the housing and is joined to the housing. An inner space of the tubular part communicates with the inner space of the filter element. In this configuration, the structural strength of the filter housing is enhanced by making the integrated body of the end caps and the filter element function as the reinforcing means for the housing.

16 Claims, 3 Drawing Sheets

U.S. PATENT DOCUMENTS

| | | |
|---|---|---|
| 3,719,983 | 3/1973 | Funk et al. . |
| 3,769,128 | 10/1973 | Manjikian . |
| 3,813,334 | 5/1974 | Bray . |
| 3,850,813 | 11/1974 | Pall et al. . |
| 3,902,858 | 9/1975 | Chernykh . |
| 3,920,553 | 11/1975 | Cliento . |
| 3,932,153 | 1/1976 | Byrns . |
| 3,982,980 | 9/1976 | van Manen . |
| 4,062,781 | 12/1977 | Strauss et al. . |
| 4,069,091 | 1/1978 | van Manen . |
| 4,148,732 | 4/1979 | Burrow et al. . |
| 4,206,050 | 6/1980 | Walch et al. . |
| 4,218,324 | 8/1980 | Hartmann et al. . |
| 4,353,761 | 10/1982 | Woerz et al. . |
| 4,386,999 | 6/1983 | Fortuna et al. . |
| 4,402,830 | 9/1983 | Pall . |
| 4,457,795 | 7/1984 | Mason et al. . |
| 4,500,426 | 2/1985 | Ishii et al. . |
| 4,517,090 | 5/1985 | Kersten et al. . |
| 4,522,719 | 6/1985 | Kuwajima et al. . |
| 4,547,289 | 10/1985 | Okano et al. ............ 210/442 |
| 4,552,612 | 11/1985 | Fortuna et al. . |
| 4,721,546 | 1/1988 | Clark et al. . |
| 4,741,788 | 5/1988 | Clark et al. . |
| 4,743,331 | 5/1988 | Nuttall et al. . |
| 4,758,392 | 7/1988 | Collins et al. . |
| 4,784,709 | 11/1988 | Unger et al. . |
| 4,786,298 | 11/1988 | Billiet et al. . |
| 4,828,698 | 5/1989 | Jewell et al. . |
| 4,839,037 | 6/1989 | Bertelsen et al. . |
| 4,839,048 | 6/1989 | Reed et al. ............ 210/453 |
| 4,855,058 | 8/1989 | Holland et al. . |
| 4,872,990 | 10/1989 | Van Wijk . |
| 4,929,354 | 5/1990 | Meyering et al. . |
| 4,956,089 | 9/1990 | Hurst . |
| 4,963,260 | 10/1990 | Naoi et al. . |
| 5,064,485 | 11/1991 | Smith et al. . |
| 5,096,591 | 3/1992 | Benn . |
| 5,128,039 | 7/1992 | Gabrielson . |
| 5,130,023 | 7/1992 | Feint . |
| 5,147,541 | 9/1992 | McDermott, Jr. et al. . |
| 5,174,896 | 12/1992 | Harms, II . |
| 5,178,753 | 1/1993 | Trabold . |
| 5,252,207 | 10/1993 | Miller et al. . |
| 5,256,285 | 10/1993 | Tomita et al. ............ 210/453 |
| 5,275,743 | 1/1994 | Miller et al. . |
| 5,277,807 | 1/1994 | Lavoie et al. . |
| 5,290,445 | 3/1994 | Buttery . |
| 5,403,482 | 4/1995 | Steere et al. . |
| 5,472,606 | 12/1995 | Steere et al. . |

5,776,342

FILTER ASSEMBLY

TECHNICAL FIELD

The present invention relates to filter assemblies and, in particular, to disposable cartridge-type capsule filter assemblies having enhanced strength against internal pressure in the filter housing in a capsule type filter assembly which has inlet and outlet nozzles.

BACKGROUND OF THE INVENTION

In filtration of water, chemicals and solvents, a filter housing often includes a vent nozzle (air vent nozzle) for the purpose of releasing gas in the area (hereinafter referred to as the upstream area) where unfiltered liquid in the filter housing (hereinafter referred to as the upstream side liquid) is accommodated so that the space of the upstream area is occupied with liquid. A cartridge type filter assembly may include a filter element in the shape of a cylinder, usually a circular cylinder, and a housing which accommodates the filter element and may include a vent nozzle. Conventionally, it has been difficult to maintain reliability while minimizing the size of the filter assembly for a given filtration surface area.

Installation of a vent nozzle for releasing foam in the filter is disclosed, for example, in Japanese Utility Model Laid-Open No. 122614/1992. In this capsule type filter assembly, the internal pressure of the filter housing is entirely applied to only the wall part of the housing. Accordingly, the wall part of the housing has to be thickened for enhancing pressure tightness, particularly where the capsule type filter assembly is to be utilized in high pressure filtration applications. This thickening of the wall causes an increase in the weight and/or dimension of the capsule type filter assembly. In many applications a bulky and/or heavy capsule type filter assembly is not satisfactory.

SUMMARY OF THE INVENTION

The present inventors have carefully studied the development of a light and small capsule type filter assembly without sacrificing a fluid-tight seal in high pressure operations and found that a filter assembly can be simplified and have improved fluid-tight characteristics in high pressure operations by joining the filter element end caps directly to the housing ends, with at least one end including a tubular part extending through the housing. In aspect of the invention, the filter element includes first and second end caps, each having a tubular part. The respective tubular parts may function as a vent nozzle and outlet nozzle (or inlet nozzle) in the respective end caps. In this configuration, the tubular parts penetrate the housing and are joined to the housing in a liquid-tight manner. In an alternate aspect of the invention, one of the tubular parts is replaced with a joining material which is joined to the housing.

Advantages of the capsule filters embodying some aspects of the present invention include providing an improved capsule type filter assembly having increased pressure tightness while employing the same materials used in conventional capsule type filter assemblies; providing a capsule type filter assembly in which a vent nozzle may be easily provided in the downstream side of the filter and whereby foam generated when the liquid is passed through the filter medium can be advantageously removed; and improving the reliability of capsule type filter assemblies at a reduced cost.

A filter assembly embodying aspects of the present invention may include:

a housing having first and second end portions and first and second openings;

a cylindrical filter element disposed within the housing and including a filter medium and first and second end caps, the first and second end caps being joined directly to the respective first and second end portions of the housing, the first end cap including a first tubular portion having a third opening, the first tubular portion being disposed in and joined to the first opening of the housing.

The second end cap of the filter assembly may include a second tubular portion, the second tubular portion being disposed in and joined to the second opening of the housing. Alternatively, the second end cap of the filter assembly may include a joint material joined to the second end of the housing.

That is, a capsule type filter assembly according to one embodiment of the present invention includes end caps sealed to respective ends of the filter media with each end cap including a tubular part. An inner space of the tubular parts is in fluid communication with an inner space of the filter element. The tubular parts of each end cap extend outside of the housing joining the tubular parts with the housing in a liquid-tight manner. In this configuration, the structural strength of the filter housing is enhanced by making an integrated body of the end caps and the filter media function as the reinforcing means for the housing.

Moreover, the present invention provides a capsule type filter assembly in which a vent nozzle may be easily provided in the downstream area of the filter and foam generated when the liquid is passed through the filter medium 40 may be advantageously removed.

The term "joint" or "joining" used herein means an integrated and irreversible joint or joining such as thermal fusion or welding. The term "seal" or "sealing" used herein means a bond or bonding that resists the pressure applied to the filter assembly, such as pressure welding, adhesion or joining.

Although aspects of the present invention are tentatively defined using the appended claims, it should be clear that these claims are exemplary of aspects of the invention. Alternate aspects of the invention include the devices, elements, and methods described herein in any combination or subcombination without limitation. Accordingly, there are any number of alternate combinations for defining different aspects of the invention which combine one or more elements from the existing claims or from the embodiments disclosed in the specification in various combinations or subcombinations, without limitation other than the existing prior art.

DISCLOSURE OF THE INVENTION

Figure 1:
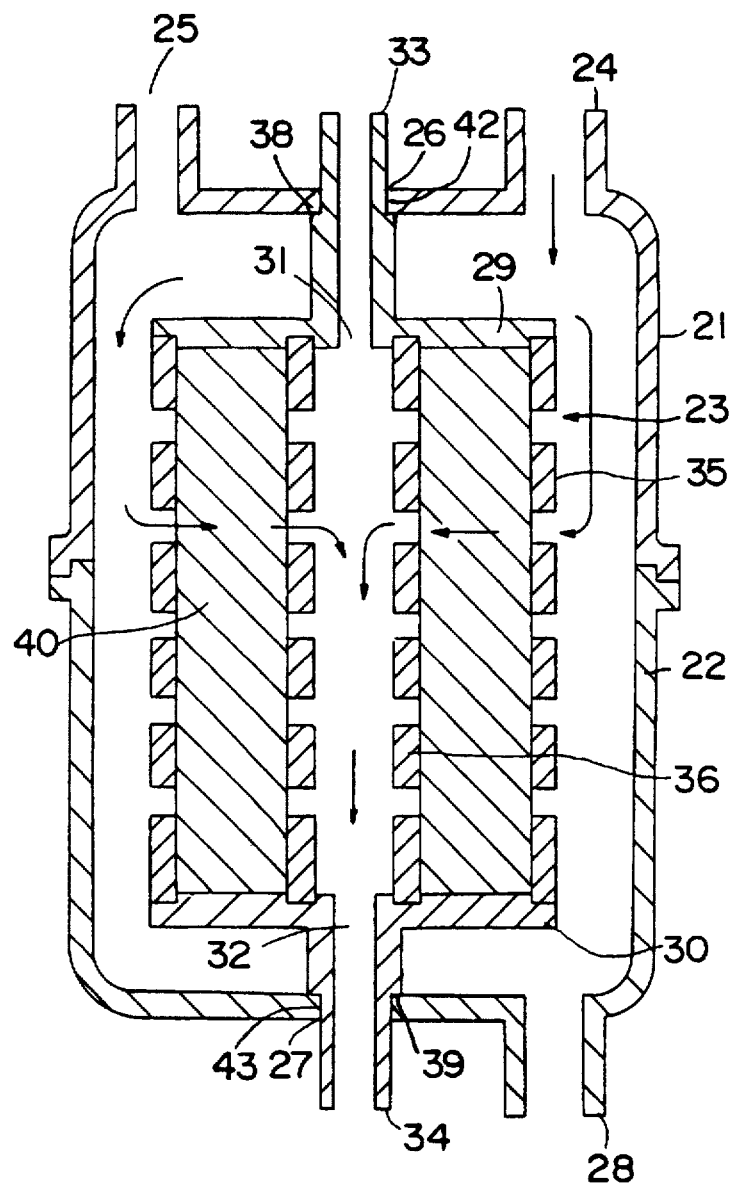
FIG. 1: A sectional view of a capsule type filter assembly with vent nozzles according to one embodiment of the present invention.

Now, referring to the drawings, configurations of a capsule type filter assembly according aspects of the present invention are explained.

FIG. 1 is a schematic drawing illustrating a capsule type filter assembly of one embodiment of aspects of the present invention. In this embodiment, the capsule type filter assembly is composed of an upper housing 21, a lower housing 22, and a filter element 23. The cover portion of the upper housing 21 has an inlet nozzle 24 (liquid inlet) and an upstream vent 25. Liquid to be filtered is introduced into the filter housing through the inlet nozzle 24. Air to be expelled from the space of the upstream area of the filter housing is vented via upstream vent 25 so that the upstream space of the filter within the housing is filled with a liquid.

A first opening 26 is provided in the upper housing, normally in the center part of the cover portion. A second opening 27 is provided, normally in the center part of the bottom portion of the lower housing 22. If required, a drainage outlet 28 is further included in the bottom portion of the lower housing.

The filter element 23 is prepared by forming a filter medium 40 into the shape of a cylinder, usually a circular cylinder. Alternatively, the filter element 23 may be prepared by first pleating the filter medium 40 and then forming the pleated filter medium 40 into the shape of a cylinder, usually a circular cylinder. In most cases, since the filter medium 40 itself does not have enough structural strength, it is preferable to install a porous and liquid-permeable core (inner cylinder) 36 in the central portion thereof and, if required, to install a porous and liquid-permeable cage (outer cylinder) 35 in the periphery portion thereof. The core and/or cage can further increase the reliability of the capsule filter assembly.

The filter element preferably includes liquid-tight end caps 29 and 30 provided at both ends of the filter media 40 to seal the ends of the filter media in a liquid-tight manner. The filter media 40 is fixed between the two end caps by directly joining the ends of the filter media 40 itself to the respective end caps. Further, the core and/or cage ends may be structurally joined to the respective ends caps by means of welding and the like. In the respective end caps, an aperture 31 or 32 may be formed in their central portions. Tubular parts 33, 34 preferably extend from the respective end caps 29, 30 about the aperture toward the outside of the housing. The inner space of the tubular parts 33 and 34 may be connected with the internal space of the cylindrical filter element 23 through the apertures 31 and 32.

The tubular parts may be formed integrally with the end caps or may be formed by joining the tubular part material onto the aperture of the end cap. In the most preferred embodiments, the tubular parts are formed as a single piece with the end pieces to increase structural strength. If the tubular parts are formed from more than one piece, the tubular parts are preferably joined by welding to ensure high structural integrity and to increase fluid tight connections under high pressures.

The tubular part 33 extending from the upper end cap 29 may be inserted into the opening 26 formed in the cover portion of the upper housing 21 and may function as the downstream side vent nozzle of the capsule type filter assembly. The tubular part 34 extending from lower end cap 30 may be inserted into the opening 27 formed in the bottom portion of lower housing 22 and functions as the outlet nozzle (filtrate discharge pipe). The respective connection areas 42, 43 of the respective tubular parts 33, 34 are joined and sealed in a liquid-light manner by welding, adhesion or other means with the upper and lower housings pieces 21, 22. In the most preferred embodiments, the tubular parts 33, 34 are welded to the upper and lower housing end pieces to provide for greater mechanical strength. Further, by disposing the tubular parts through the housing and/or by including seats 38, 39 on the tubular parts, the overall reliability of the capsule filter is enhanced.

The capsule type filter assembly of the above configuration may be assembled, for example, by forming an integrated body by first joining the end caps 29 and 30 to the filter media 40, and any core and/or cage; inserting the tubular part of the lower end cap 30 into the opening 27 that is formed in the bottom portion of the lower filter housing 22; joining the connection area by welding, adhesion or other means in a liquid-tight manner; overlaying the upper housing 21 onto the integrated body so that the tubular part of the upper end cap 29 is inserted into the opening 26 that is formed in the cover portion of the upper filter housing 21; and joining the connection area between the upper and lower housings as well a the upper housing and the tubular part of the upper end cap by welding, adhesion or other means in a liquid-tight manner. While the configuration illustrated in FIG. 1 and explained in the above description has two vertically divided portions, the capsule type filter assembly according to the present invention is not limited to such a configuration and may be prepared, for example, by forming the housing bottom and side wall as an integral body and then mounting a cover portion thereon. Alternatively, the housing may include a cylindrical housing section disposed between and mounted to the upper and lower housing sections 21, 22. However, this configuration is less preferred because three housing pieces are required.

Materials usable for the filter medium 40 of the filter element in the capsule type filter assembly according to the present invention include organic porous films made of polyolefin, nylon, fluorocarbon resin or other materials. The end cap and/or housing may be formed by cast molding, injection molding or other means from polyolefin, fluorocarbon resin such as PFA, or other materials. The cage 35 and/or the core 36 either of which may be used for reinforcing the filter element/housing can be formed from similar material usable in the end cap and/or housing.

The ends of each of the inlet nozzle 24, the upstream side vent nozzle 25, the drainage outlet 28, the downstream side vent nozzle 33, and the outlet nozzle 34 may be in the form of flanges to be connected to the system pipings or in the form of ports that can be directly coupled to the piping joint to be connected to the system pipings.

In operation, liquid flows into the housing through the inlet nozzle 24, enters the upstream space, passes through the cage 35 (if any), the filter media (40), the core 36 (if any) into the interior space, and out of the outlet nozzle 34 (see the arrow marks in FIG. 1). In this process, gas in the space of the upstream side (upstream area) of the filter element in the filter housing forms the upper layer of the liquid standing in the housing and may be forced to the outside through the upstream side vent nozzle 25. Accordingly, the upstream area inside the housing may be filled with the liquid. Foam is generated by pressure differences when the liquid passes through the filter medium 40 and enters into the space within the filter element. The foam forms an upper layer of the liquid in the space, and is discharged to the outside of the housing through the downstream side vent nozzle 33 that is provided in the upper portion of the filter element.

The capsule type filter assembly of the embodiment of the present invention is composed, as explained above, by integrating each of the end caps of the filter element with the outlet nozzle of the downstream side liquid (filtrate) and the downstream side vent nozzle, respectively, in the capsule type filter assembly; joining the downstream side vent nozzle with the upper housing, respectively, in a liquid-tight manner. By adopting such a configuration, the structure of the filter assembly may be simplified. Further, the configuration unexpectedly improves the pressure tightness and reliability of the capsule type filter assembly. This is believed to be due to the fact that the integrated body comprising the upper end cap 29, the filter element 23, any cage/core, and the lower end cap 30 is joined to the upper filter housing 21 at the tubular part 33 and to the lower filter housing at the tubular part 34, each tubular parts being at either end of the body. In this way, the integrated body functions as a reinforcing member in the manner by a stem of the filter housing, and as a result, the structure strength of the housing is greatly increased.

Many capsule type filters suffer reliability problems in the area of the bond between the upper housing, the filter element, the lower housing, and any inlet/outlet and/or vent communicating with the interior of the filter media. In particular, the central portion of the upper and/or lower portion of the housing may distend and therefore weaken the bond sealing the filter element to the outlet/vent. For example, in high pressure/temperature capsule filters, the end of the housing may distend outward, causing reliability problems. By contrast, embodiments of the present invention solve these problems by providing added structural rigidity through an additional column extending through the center of the filter housing and incorporating the filter element, cage, and/or core. This configuration has been found to have greatly improved reliability. Additionally, the conventional problems associated with the thickness of the wall of a filter housing (which have heretofore been necessary to ensure the pressure tightness of the filter housing) have been overcome. It is thus possible to fabricate a filter housing that has improved pressure tightness with the same wall thickness and material as conventional ones. It is also thus possible to fabricate a housing having a thinner wall or to fabricate a housing with a lighter material, without sacrificing the pressure tightness of the filter housing.

While the above drawing and description are mentioned with regard to capsule type filter assemblies where a fluid (e.g., a liquid) passes from the outside of the filter element to the inside thereof, it is apparent for those skilled in the art that the capsule type filter assemblies according to the present invention can be used in the inverse situation where a fluid (e.g., a liquid) passes from the inside of the filter element to the outside thereof The use of the latter case is hereby explained in connection with the capsule type filter assembly embodied as FIG. 1. The tubular part 34 formed at the lower end cap is now used as the inlet nozzle from which the liquid to be filtered is introduced into the housing, and the liquid is allowed to pass from the inner surface of the filter medium 40 outwards. The liquid is then discharged outside through the opening 28 formed in the bottom portion of the housing which is now used as the outlet nozzle. In this process, the tubular part 33 can function as the upstream side vent nozzle and the aperture 25 formed in the cover portion of the housing can function as the downstream side vent nozzle. In this case, the aperture 24 shown in FIG. 1 may be unnecessary and can be excluded.

In an alternate embodiment, the improved reliability discussed above may also be achieved by providing the tubular part on only one of the end caps and providing a joint material with the housing on the other end cap. As with the first embodiment, the joint material and the tubular part are fixed to the housing by any suitable means, put preferably by joining (e.g., by welding). Accordingly, aspects of the present invention may comprise: a housing having openings; a cylindrical filter medium disposed in the housing; upper and lower end caps which seal the respective ends of the filter medium in a liquid-tight manner, one of the upper end cap and lower end cap having an opening and a tubular part extending from the opening so that the inner space of the tubular part communicates with the inner space of the cylindrical filter element; a joint material fixing the other end cap to the housing, wherein the tubular part is inserted into one of the housing openings and the connection areas of said tubular part and said joint material with said housing are joined in a liquid-tight manner.

Figure 2:
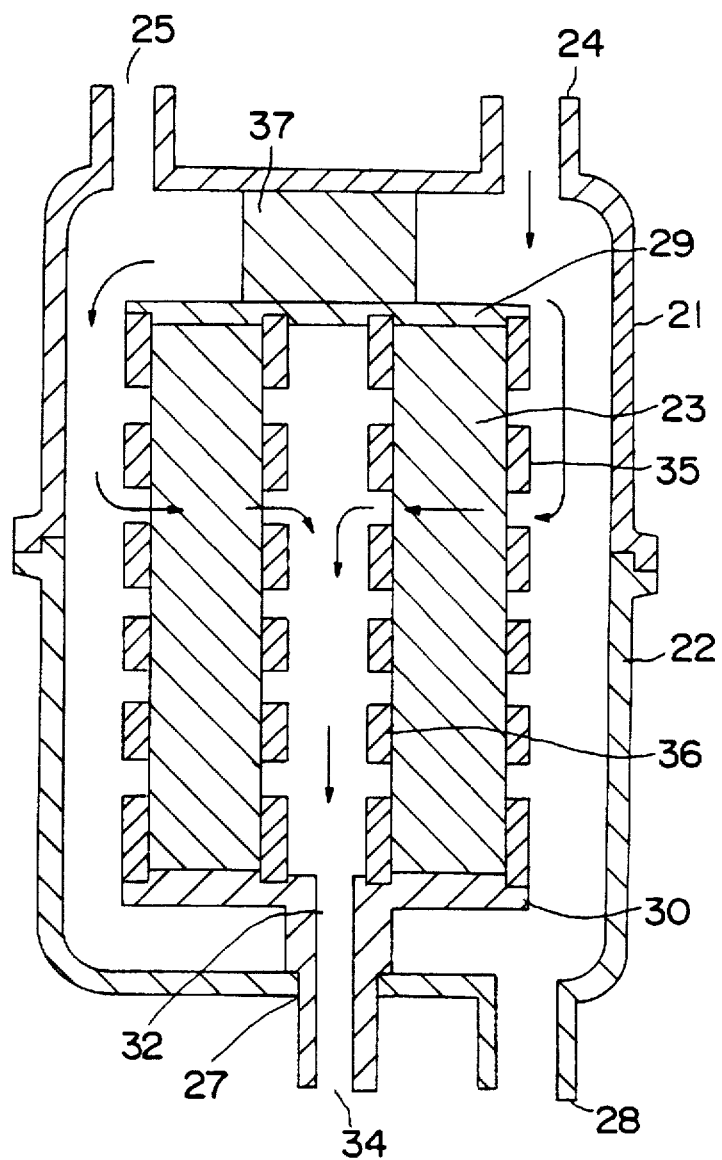
FIG. 2: A sectional view of a capsule type filter assembly according to another embodiment of the present invention.

FIG. 2 is a schematic drawing illustrating an embodiment of the filter assembly according to the second aspect of the present invention. Components of FIG. 2 which are similar to the components shown in FIG. 1 are referred to by the same reference numerals. The filter assembly of FIG. 2 differs from the filter assembly shown in FIG. 1, the former differs from the latter in the point wherein the upper end cap has a joint material 37 in place of the tubular part and that the joint material 37 and the housing are joined by welding or other means. The joint material 37 may be integrally formed with an end cap 29, or may be formed as separate components and fixed onto an end cap 29. In alternate embodiments, the joint material 37 may be variously configured. For example, may occupy no more than about between 90% and 10%, preferably no more than about between 70% and 30% and more preferably no more than about one half of the area of the end cap 29. Further, where a joint material is utilized, the joint material preferably contacts the end cap and/or housing over about at least 10% of the joint material, more preferably over about at least 50% of the joint material and even more preferably over about at least 75% of the joint material and most preferably about over the entire joint material. The tubular portion 27 and the joint material 37 preferably space the respective end caps 30, 29 from the housing forming form an annular channel between the end cap and the housing. Further, in embodiments where the upper and lower housing covers are formed identically, the joint material may extend through and seal opening 26.

In the filter assembly of such an embodiment, the liquid flows in a similar manner as with the embodiment shown in FIG. 1. However, where a downstream side vent nozzle is not provided, the removal of air is not carried out in the downstream side of the filter (inner space of the filter element). In the embodiment shown in FIG. 2, the pressure tightness of the filter assembly may also be enhanced since the integrated body of the filter element and the end caps functions in the manner of a stem of the filter housing.

EXAMPLES

The present invention is illustrated in more detail by way of detailed examples given below. These examples are to illustrate specific embodiments of the present invention and not to limit the scope of the present invention thereby.

Working Example 1

By injection molding of polypropylene, a filter housing (wall thickness: 3 mm) 21 and 22 of the configuration shown in FIG. 1 and having about 75 mm height and about 70 mm diameter was formed. Also by injection molding of polypropylene, each of the end caps 29 and 30 having a tubular part shown in FIG. 1 was formed as an integral body. As shown in FIG. 1, the first and second end caps 29, 30 are preferably identical to reduce molding costs. The tubular part 33 and 34 of the ends caps had 12 mm of an outside diameter and 8 mm of an inside diameter. The core part 36 of the filter element having 15 mm of outside diameter and 12 mm of inside diameter was formed by injection molding of polypropylene. The filter element 23 was made by laminating polyolefin non-woven fabrics on both sides of a PTFE porous film, folding it into a pleat and then forming the pleat into a cylindrical form of a 55 mm outside diameter and a 32 mm inside diameter. The filter element and the end caps were joined by thermal welding. The connected portions of the tubular parts of the end caps with the housings were joined by thermal fusion of the polymer.

The filter housing of the capsule type filter assembly thus constructed was filled with water, and additional hydraulic pressure was applied to the housing. The pressure tightness value of the filter assembly was determined as the applied hydraulic pressure value when the housing was broken. The pressure tightness value of the filter housing was 30 kg/cm$^2$.

Working Example 2

A filter assembly as shown in FIG. 2 was formed using the same materials and methods as in Working Example 1. The sizes of each component were similar to those in the filter assembly of Example 1. However, the upper end cap 26 was formed into a disc shape and a cylindrical joint material 37 of a 20 mm diameter was joined to the disc by thermal fusion. The joint material 37 was also joined by thermal fusion to the housing. The pressure tightness was determined in the same way as Working Example 1 and found to be 32 kg/cm$^2$.

Comparative Example 1

Figure 3:
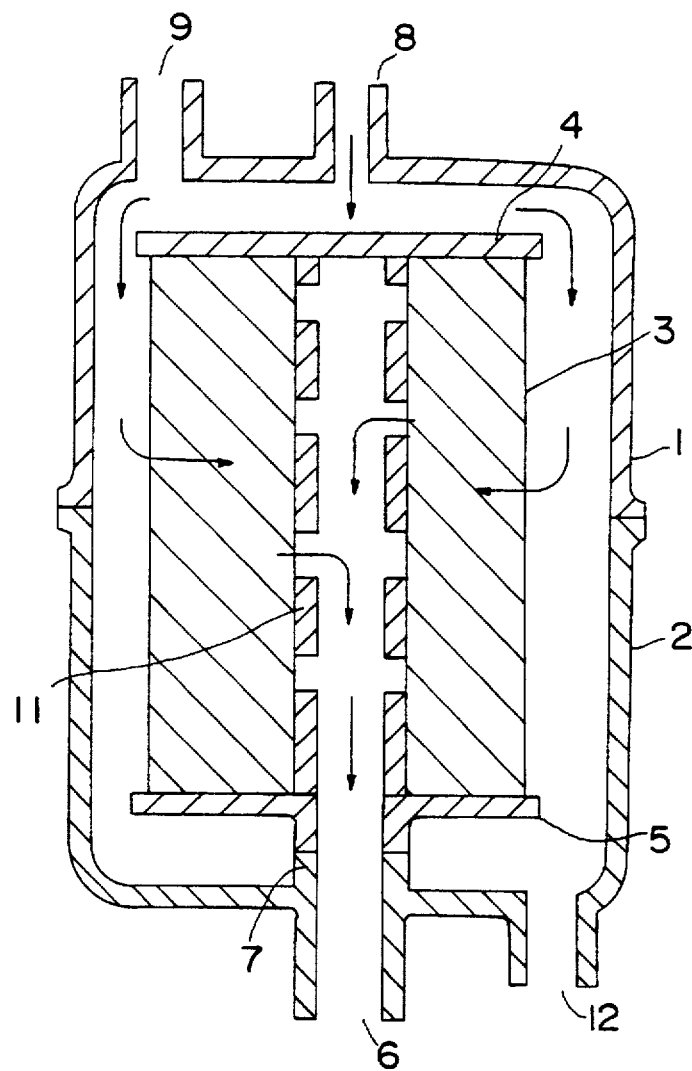
FIG. 3: A sectional view of one example of a comparison capsule type filter assembly having a vent nozzle.

FIG. 3 shows a comparison configuration constructed by the inventors for comparing the embodiments shown in FIGS. 1 and 2 with a reference embodiment.

A detailed description of the comparison configuration follows. The comparison configuration of FIG. 3 includes upper and lower housing portions 1 and 2, and a cylindrical filter element 3 disposed in the housing portions. The filter element 3 is formed by pleating a filter media and then shaping the filter media into a cylinder, usually a circular cylinder. A blind end cap 4 and an open end cap 5 are sealed in a liquid-tight manner to opposite end surfaces of the filter media. An outlet nozzle 6 is formed in the center of the bottom portion of the lower housing 2. A tubular protrusion 7 is raised from the outlet nozzle 6 inwardly to the housing forming an extending portion on which the filter element is installed. The filter element 3 is fixed to a predetermined position in the filter housing by welding the open end cap 5 to the installation seat 7. A porous core (inner cylinder) 11 is placed inside the filter element. The core 11 is welded to the end caps 4 and 5. A cover portion of the upper housing portion 1 has an inlet nozzle 8 through which the liquid to be filtered is introduced into the housing and a vent nozzle 9 in the upstream area of the filter. A drainage outlet 12 may be provided on the bottom portion of the lower housing.

A comparison filter assembly as shown in FIG. 3 was formed using the same materials and methods as in Working Example 1. The sizes of the housings and the filter element were equivalent to the filter assembly shown in FIG. 1. The pressure tightness was determined in the same way as Working Example 1 and found to be 20 kg/cm$^2$.

As explained above, since the capsule type filter assembly according to one aspect of the present invention includes an integrated body comprising the filter element joined to the cover portion and bottom portion of the filter housing, the integrated body functions as the reinforcing member of the filter housing. Accordingly, the pressure tightness of the filter housing is remarkably enhanced or the filter housing can be fabricated with lighter materials while maintaining the pressure tightness of the filter housing.

Taking advantage of the above characteristics, the capsule type filter assembly according to the present invention is beneficially applicable to fields where downsizing of the filter assembly is required, such as filters for a semiconductor production line, filters for a liquid crystal production line, filters for a production line of chemicals for an electric industry, and filters for a purified water production line.

We claim:

1. A filter assembly comprising:

a housing having first and second end portions and first and second openings formed in the first and second end portions, respectively;

a cylindrical filter element disposed within the housing and including a filter medium and first and second end caps, the first and second end caps being joined to the first and second end portions, respectively, of the housing, the first end cap being sealed to the first end portion of the housing and including a third opening communicating with the first opening of the housing and a portion abutting against an interior surface of the first end portion of the housing.

2. The filter assembly of claim 1 wherein the second end cap is sealed to the second portion of the housing and includes a fourth opening communicating with the second opening of the housing and a portion abutting against an interior surface of the second portion of the housing.

3. The filter assembly of claim 2 wherein the third and fourth openings communicate with an interior of the filter element.

4. The filter assembly of claim 2 wherein the filter element includes a core and a cage joined to the first and second end caps.

5. The filter assembly of claim 4 wherein the cage is spaced from the housing.

6. The filter assembly of claim 2 wherein the first and second end caps are spaced from the housing to create an annular flow channel between the first end cap and the first end portion of the housing and between the second end cap and the second end portion of the housing.

7. The filter assembly of claim 2 wherein each end cap includes a tubular portion extending through and sealed to one of the end portions of the housing.

8. The filter assembly of claim 1 wherein the second end cap includes a joint material joined to the second end of the housing.

9. The filter assembly of claim 8 wherein the joint material has an outer diameter that is no more than about half of an outer diameter of the second end cap.

10. The filter assembly of claim 8 wherein the filter element includes a core and a cage joined to the first and second end caps.

11. The filter assembly of claim 10 wherein the cage is spaced from the housing to permit fluid flow between the cage and the housing.

12. The filter assembly of claim 8 including a first annular flow channel formed between the first end cap and the first end portion of the housing and a second annular flow channel formed between the second end cap and the second end portion of the housing.

13. The filter assembly of claim 8 wherein each end cap includes a tubular portion extending through and sealed to one of the end portions of the housing.

14. A filter assembly which comprises:

a housing having first and second end portions and first and second openings respectively formed in the first and second end portions;

a cylindrical filter element including a filter medium having first and second ends and being disposed in the housing, the cylindrical filter element including first and second end caps sealed to the first and second ends, respectively, of the filter medium in a liquid-tight manner, the first end cap being sealed to the first end portion of the housing and including an opening communicating with the first opening of the housing and a portion abutting against an interior surface of the first end portion of the housing, and the second end cap being a blind end cap including a joint material abutting against an interior surface of the second end portion of the housing.

15. A method of making a filter assembly comprising:

abutting a portion of a first end cap of a filter element against an interior surface of a first end portion of a housing with an opening in the first end cap communicating with a first opening in the first end portion;

abutting a portion of a second end cap of the filter element against an interior surface of a second end portion of the housing with an opening in the second end cap communicating with a second opening in the second end portion; and sealing the first and second end caps to the first and second end portions of the housing at the first and second openings, respectively.

16. The method of claim 15 including placing a tubular portion of the first end cap through the first opening.

* * * * *